April 6, 1926.

G. C. CUMMINGS

TELEGRAPH SYSTEM

Filed May 15, 1923

1,579,211

Inventor:
George C. Cummings.
by Jul CR. Palmer Atty

Patented Apr. 6, 1926.

1,579,211

UNITED STATES PATENT OFFICE.

GEORGE C. CUMMINGS, OF ORANGE, NEW JERSEY, ASSIGNOR TO WESTERN ELECTRIC COMPANY, INCORPORATED, OF NEW YORK, N. Y., A CORPORATION OF NEW YORK.

TELEGRAPH SYSTEM.

Application filed May 15, 1923. Serial No. 639,043.

*To all whom it may concern:*

Be it known that I, GEORGE C. CUMMINGS, a subject of the King of Great Britain, residing at Orange, in the county of Essex, State of New Jersey, have invented certain new and useful Improvements in Telegraph Systems, of which the following is a full, clear, concise, and exact description.

This invention relates to signaling systems and particularly to duplex telegraph systems.

The object of the invention is the transmission of signals over a conductor in opposite directions simultaneously without the use of line balancing equipment.

In accordance with the preferred form of the invention at opposite ends of a signaling conductor there is connected a relay having its windings arranged in series opposing but with means for rendering the relay responsive only to incoming signals.

Figure 1:
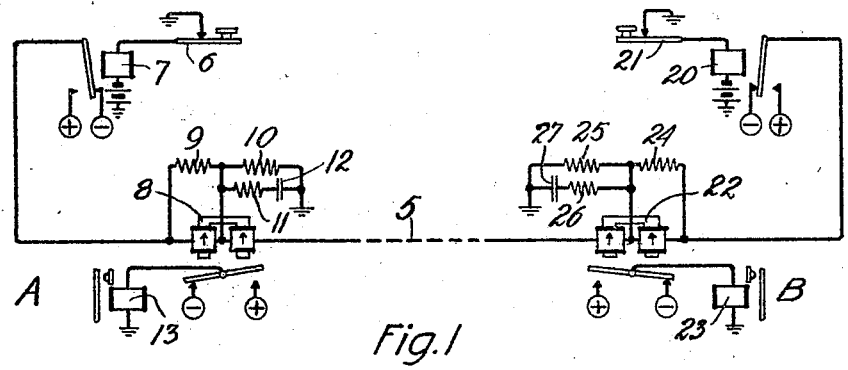
Figure 2:
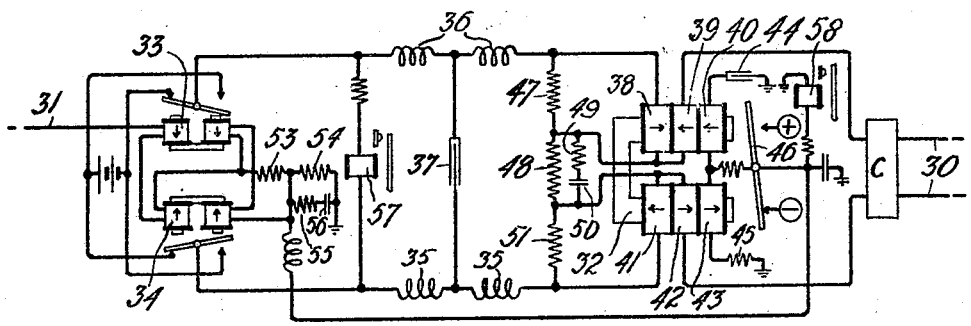

A better understanding of the invention may be had from the following description, taken in conjunction with the accompanying drawings in which Fig. 1 shows the invention applied to a grounded system, while Fig. 2 illustrates an arrangement for signaling between a composite metallic telephone and telegraph system and a grounded telegraph extension circuit.

Referring now to Fig. 1 there is shown a line conductor 5, connecting two remotely situated stations A and B. At each of these stations there is associated with the line conductor 5 suitable transmitting and receiving mechanisms. The transmitting mechanism at station A comprises a transmitting key 6 which controls the operation of a pole changer relay 7 through the instrumentality of which impulses of different polarities are impressed on the line conductor 5. Also connected in the line conductor 5 is a relay 8 having two windings which are connected in series opposing. In bridge of the left hand winding of relay 8 there is connected a resistance 9, the value of which is approximately equal to the D. C. resistance of this winding. Bridged at the mid-point of the relay to ground is a resistance 10 in bridge of which there is a resistance 11 and a condenser 12.

Likewise at station B there is located a transmitting key 21 and a pole changer relay 20 as well as a receiving relay 22 and a sounder 23 controlled thereby. As in the previous case relay 22 has associated therewith a resistance 24 which is in bridge of the right hand winding of this relay, a resistance 25 connected to the mid-point of the relay 22 to ground and a resistance 26 and condenser 27 in bridge of resistance 25, the purpose of which will be more clearly described hereinafter.

Under normal conditions the pole changers at each of the stations A and B connect the negative pole of the batteries so that no current flows over the line conductor 5. Current is, however, flowing from each terminal battery through the left hand winding of relay 8 and the right hand winding of relay 22. The circuit of this current may be traced from the negative pole of battery through the front contact of relay 7, left hand winding of relay 8 shunted by the resistance 9 and thence through the resistance 10 to ground. Likewise, at station B, the circuit of the current may be traced from the negative pole of battery through the front contact of relay 20, right hand windings of relay 22 shunted by resistance 24 and thence through resistance 25 to ground. The value of the resistances 10 and 25 is selected to be approximately equal to the resistance of the average length of line wire and for general purposes may be placed at approximately 2,500 ohms. A current flowing under the conditions just described serves to hold the armatures of the relays against their marking contacts. However, upon the pole changer at station A being reversed, current of a positive polarity would then meet negative polarity from station B and current much in excess of that previously flowing through one winding of the relay at station A would flow through both windings of the relay and also through the relay 22 at station B as well as through the line conductor 5. Under average conditions this would be double the current previously flowing through the terminal apparatus only. It will be observed that this current although of increased strength will not operate the relay at station A because of the fact that the left and right hand windings of relay 8 are connected in series opposing and the shunt resistance 9 is taking half of the current from the left hand winding. This leaves a preponderance of current through the right hand winding, and this increased current is in the opposite direction of the negative current which passed through the left hand winding only, but the winding also being in the opposite direction a marking magnetic action upon its armature is produced as before. According to the previous description, relay 8 will therefore not respond to the reversal of the pole changer at station A which is the first requirement for a duplex system.

The reversal of the pole changer 7 at station A from its negative to its positive position causes a current to flow over the line conductor 5, which, since the batteries at the two stations are now in series aiding, will be approximately twice the current previously flowing only through the terminal apparatus. The resulting negative magnetic action in the relay 22 at station B will move the armature controlled thereby against the spacing contact. If we assume for the purpose of illustration, that with the batteries opposing the right hand winding of relay 22 is receiving a current of 10 milliamperes in a direction to produce a marking signal, then with the batteries aiding each other by reason of the reversal of the pole chamber at station A we may assume that approximately 60 milliamperes would flow through the left hand winding of relay 22 at station B in a direction to produce spacing. At the same moment there would be flowing through the right hand winding of this relay 50 milliamperes plus 10 milliamperes divided by two, i. e., 30 milliamperes in a direction to produce spacing. The armature of the relay 22 would therefore be moved to its spacing contact with the force produced by a current of 30 milliamperes to the left hand winding of relay 22. Accordingly the sounder 23 will respond giving an indication of the operation of relay 22. In this manner signals from station A may be recorded without effecting the operation of relay 8 at station A.

Heretofore in duplex telegraph systems employing balancing networks, one of the difficulties experienced has been that of securing a capacity balance for lines of somewhat unusual characteristics. These results were primarily due to the fact that the surges produced in the line must be duplicated in the balancing network so that they might be opposed to each other in the windings of the polarized receiving relay. In the system of the present invention it is apparent that since the windings of the receiving relays are in series opposing their tendency will be to automatically balance out the surges in the line conductor. Without the resistances 9 and 10; 24 and 25 common to the relays 8 and 22 respectively this balancing would be absolute but these resistances are necessary for the satisfactory operation of the relays. It has been further found necessary to place only a small fixed condenser and a timing resistance in bridge of the resistances 10 and 25 in order to take care of average line condition surges.

In the modification shown in Fig. 2 a pair of line conductors 30 extending from a distant station terminates at a repeater station at which there also terminates a grounded line conductor 31. Intermediate the metallic line circuit 30 and the ground line conductor 31 is suitable repeating apparatus for repeating impulses from one line circuit to another as well as suitable composite equipment C for permitting the simultaneous transmission of telephonic and telegraphic impulses over the metallic line circuit 30.

The repeating apparatus intermediate the two types of circuit comprises a relay 32 and a pair of relays 33 and 34. Also interposed between the two types of circuits and serially connected therewith are inductances 35 and 36 and a bridged condenser 37 which taken together serve to filter out disturbing harmonic frequencies which tend to interfere with the operation of the telephone channel. The relay 32 is made up of six windings suitably arranged on the legs of a U shaped core, and are designated by the numerals 38 and 43 inclusive. The windings 38 and 39 are connected in the upper conductor of the signaling circuit 30 while the windings 41 and 42 are connected in the lower circuit thereof. The winding 38 is arranged in series opposing to the winding 39 as was previously described in connection with the arrangement disclosed in Fig. 1 and which, as will more clearly be described hereafter, serve a similar function. Likewise, winding 41 is arranged in series opposing to winding 42. The other two windings 40 and 43 are connected with a condenser 44, a resistance 45, and the armature 46 controlled by the relay in a manner to form what is commonly known as a vibrating relay, that is, so long as impulses are not being received the armature of the relay will vibrate between its two contacts due to the charging and discharging of the condenser 44. Inasmuch as the operation of the vibrating relay is well known, further detailed description of its operation is believed unnecessary here. In bridge of the winding 38 is a resistance 47, the value of which is substantially equal to the D. C. resistance of the windings which it bridges. As in the previous case there is connected to the mid-point of the relay 32 and the resistance 47, a resistance 48 having in shunt thereof a timing resistance 49 and a condenser 50. Likewise in bridge of the winding 41 and connected to the point of connection of the resistance 48 is a resistance 51 of a value equal to the D. C. resistance of the winding 41.

Connected with the line conductor 31 are the relays 33 and 34 each of which comprises two windings which are arranged in series opposing to each other and which have associated therewith a resistance 53 in shunt of one of the windings of each of the relays, a resistance 54 connected to the mid-point of the relay and ground, and a resistance 55 and condenser 56 in bridge of the resistance 54. In order that the repeater attendant may ascertain the character of the signals being transmitted from one line circuit to another, there is connected in bridge of the circuits a polarized sounder 57 which responds to reversals of the armatures of relays 33 and 34. Likewise associated with relay 32 is polarized sounder 58, the function of which is identical to that described in connection with sounder 57.

Impulses being received from line conductor 31 pass through the windings of relays 33 and 34 for effecting the reversal of the armatures of these relays. The reversal of the armatures of these relays causes a current to flow through the windings 38 and 39, 41 and 42 of relay 32 in such a direction as not to cause the operation of this relay in a manner similar to that described in connection with the relay arrangement of Fig. 1. However, when impulses are received from the line circuit 30 they pass through the windings just enumerated in a direction such as to cause the reversal of the armature of relay 46 and the transmission through the windings of relays 33 and 34 to the line conductor 31 current impulses in accordance with those received from the line conductors 30. Likewise since the windings of relays 33 and 34 are arranged in series opposing, these relays will not respond to the application of impulses from the contacts of relay 32. The operation of the remainder of the system shown in Fig. 2 is identical with that described in connection with Fig. 1 and the function of the various resistance and capacity units is also identical with the description for Fig. 1. Further description thereof is believed unnecessary.

Although the invention has been disclosed and described in connection with a particular type of system it is, of course, obvious that variations may be made without departing from the spirit and scope of the present invention.

The invention claimed is:

1. In a duplex telegraph system, a line, a relay having two windings connected in series opposing with said line, a resistance in shunt of one of said windings to regulate the current flowing in said winding to normally maintain the relay in one position, but rendering the other of said windings effective on the receipt of an incoming impulse to reverse the position of the relay, a resistance equal to that of the average length of line in series with said resistance, and a resistance and condenser in bridge of the last-mentioned resistance for taking care of normal surges into the line.

2. In a signaling system, a pair of signaling circuits, repeating apparatus intermediate said signaling circuits comprising a plurality of electromagnetic devices having their windings connected in series opposing with said signaling circuits to be responsive only to incoming impulses to repeat corresponding impulses to the adjacent signaling circuit.

3. In a duplex telegraph system, a normally closed but ineffective circuit comprising a line conductor, a relay having two windings connected in series opposing with said line conductor, a single battery for said circuit at each terminal of said conductor, and a resistance in shunt of one of said windings to regulate the current in said winding to normally maintain said relay in one position but rendering the other of said windings effective on the receipt of an incoming impulse to reverse the position of said relay, a pole changer relay for switching said normally closed circuit to the opposite pole of one of said batteries to render said normally closed circuit effective to transmit impulses without changing the position of said first mentioned relay, and a second normally closed circuit including said changer relay and separate from said first circuit for effecting a change in the polarity of said first circuit.

In witness whereof, I hereunto subscribe my name this 12th day of May, A. D. 1923.

GEORGE C. CUMMINGS.